United States Patent [19]

Stewart

[11] Patent Number: 5,103,460
[45] Date of Patent: Apr. 7, 1992

[54] SPREAD SPECTRUM INTERCEPT APPARATUS AND METHOD

[75] Inventor: Clarence H. Stewart, 7805 Karen Forest Dr., McLean, Va. 22102

[73] Assignees: Clarence H. Stewart; Juanita H. Stewart, both of McLean, Va.

[21] Appl. No.: 581,337

[22] Filed: Sep. 12, 1990

Related U.S. Application Data

[62] Division of Ser. No. 422,838, Oct. 17, 1989, Pat. No. 5,016,256.

[51] Int. Cl.$^5$ .......................................... H04L 27/30
[52] U.S. Cl. .......................................... 375/1; 380/34
[58] Field of Search ................................ 375/1; 380/34

[56] References Cited

U.S. PATENT DOCUMENTS

| | | | |
|---|---|---|---|
| 3,980,945 | 9/1976 | Bickford | 375/1 |
| 4,217,586 | 8/1980 | McGuffin | 342/380 |
| 4,247,939 | 1/1981 | Stromswold et al. | 375/1 |
| 4,308,617 | 12/1981 | German, Jr. | 375/1 |
| 4,309,769 | 1/1982 | Taylor, Jr. | 375/1 |
| 4,388,723 | 6/1983 | Keen | 375/1 |
| 4,490,829 | 12/1984 | Van Etten | 375/1 |
| 4,545,059 | 10/1985 | Spinks, Jr. et al. | 375/1 |
| 4,607,375 | 8/1986 | Lee | 380/32 |
| 4,630,283 | 12/1986 | Schiff | 375/1 |
| 4,651,327 | 3/1987 | Fujita | 375/1 |
| 4,656,642 | 4/1987 | Apostolos et al. | 375/1 |
| 4,670,885 | 6/1987 | Parl et al. | 375/1 |
| 4,701,934 | 10/1987 | Jasper | 375/1 |
| 4,740,792 | 4/1988 | Sagey et al. | 342/457 |
| 4,821,294 | 4/1989 | Thomas, Jr. | 375/96 |
| 4,905,221 | 2/1990 | Ichiyoshi | 370/18 |
| 4,922,506 | 5/1990 | McCallister et al. | 375/18 |
| 4,985,899 | 1/1991 | Walsh | 375/1 |

OTHER PUBLICATIONS

R. C. Dixon, *Spread Spectrum Systems;* (John Wiley and Sons; 1984); pp. 306-312.

*Primary Examiner*—Bernarr E. Gregory
*Attorney, Agent, or Firm*—David B. Newman, Jr. & Associates

[57] ABSTRACT

An apparatus for detecting an intercept signal having spread spectrum modulation, having a first antenna, a second antenna, a first channelizer, a second channelizer, parametric encoders, a spread hopper processor and a nonspread hopper processor. The first antenna outputs a first sample of the intercept signal. The second antenna outputs a second sample of the intercept signal. The first channelizer channelizes the spectrum of the first sample of the intercept signal into a first plurality of spectrum segments, with each spectrum segment having a corresponding segment signal, respectively. The second channelizer channelizes the spectrum of the second sample of the intercept signal into a second plurality of spectrum segments having the same center frequencies and bandwidths as the first plurality of spectrum segments. Each spectrum segment of the second plurality of spectrum segments has a corresponding segment signal, respectively. The parametric encoders measure a corresponding plurality of frequencies and times of arrival of each of the first plurality of segment signals, respectively, and estimates a plurality of segment phase angles between corresponding segment signals having the same center frequency, of the first and second plurality of segment signals from the first and second channelizers, respectively.

12 Claims, 11 Drawing Sheets

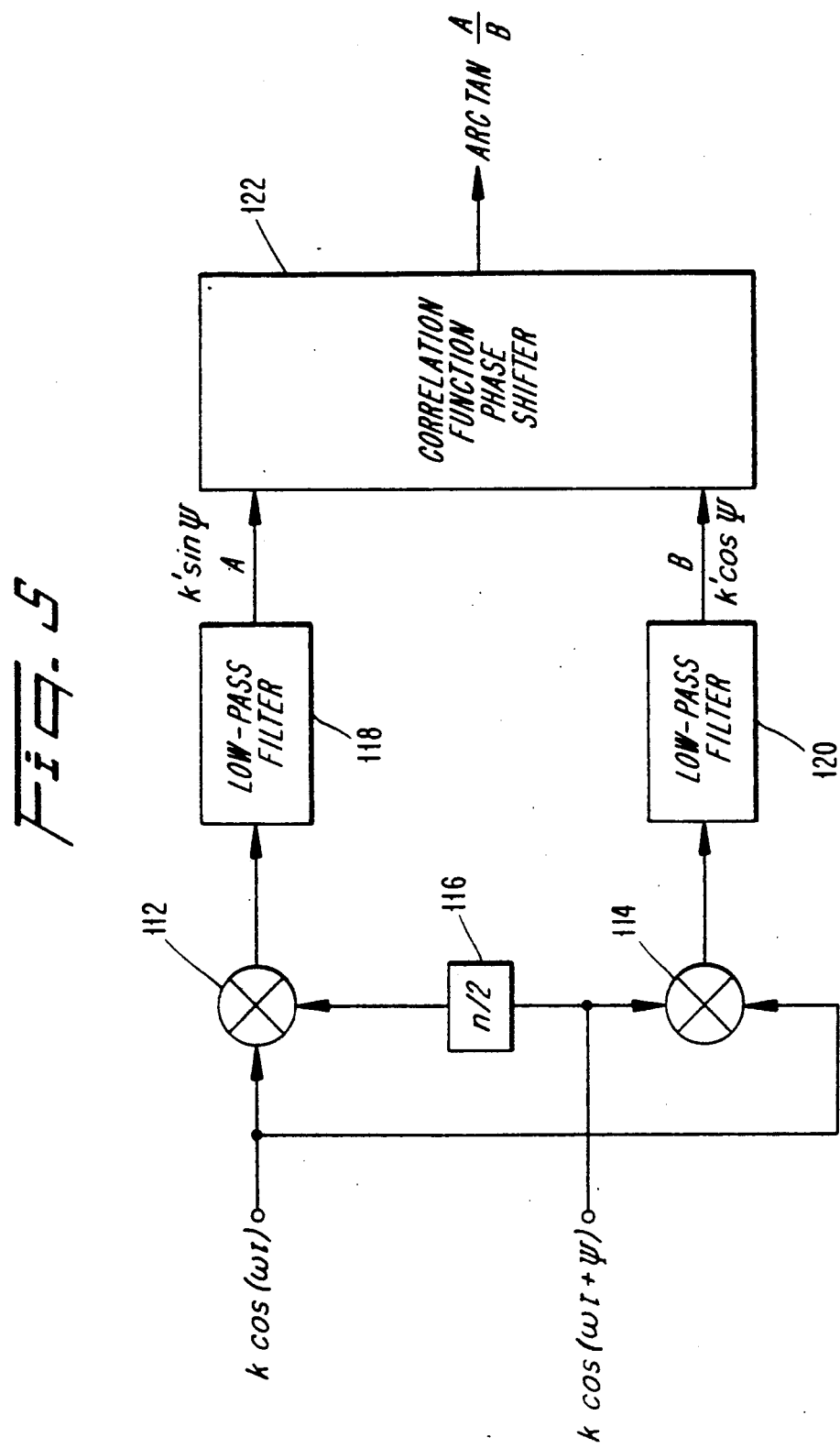

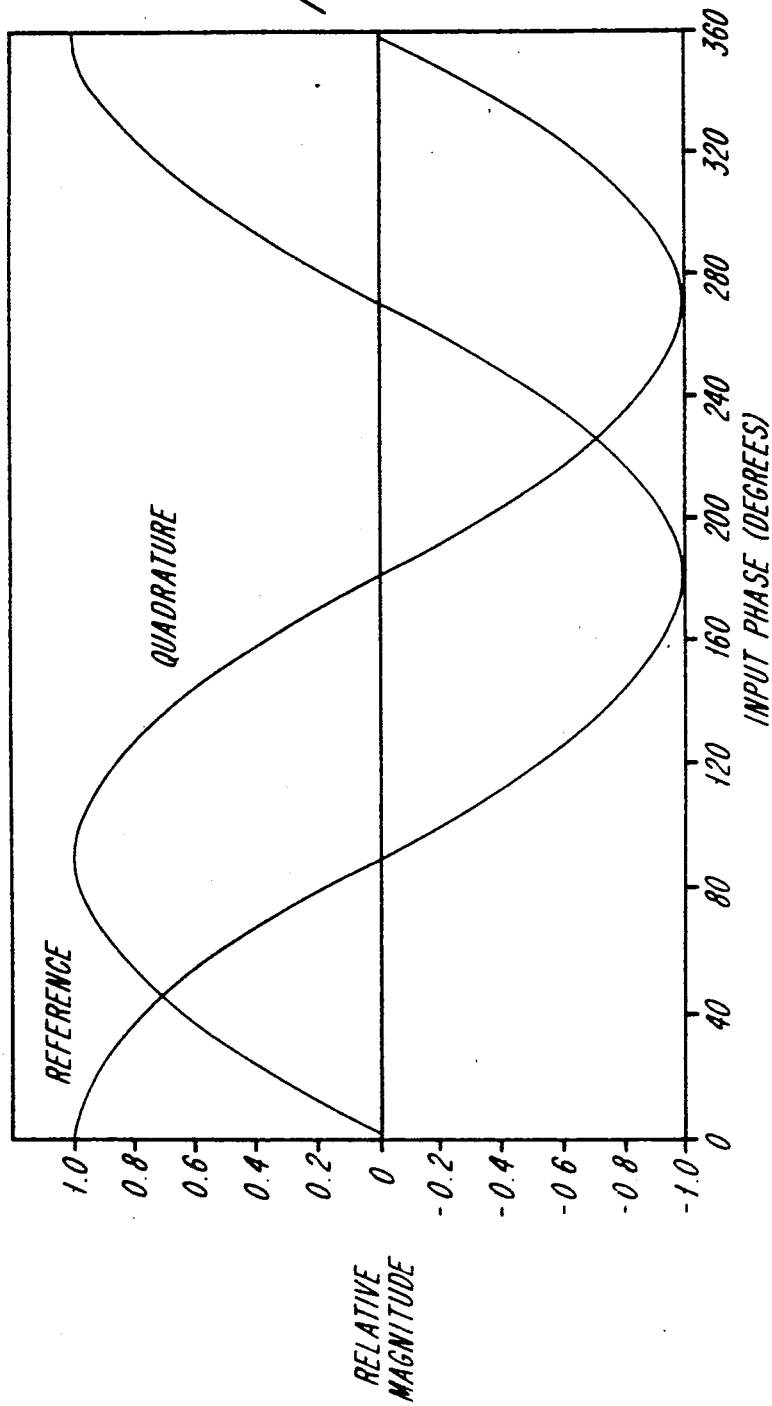

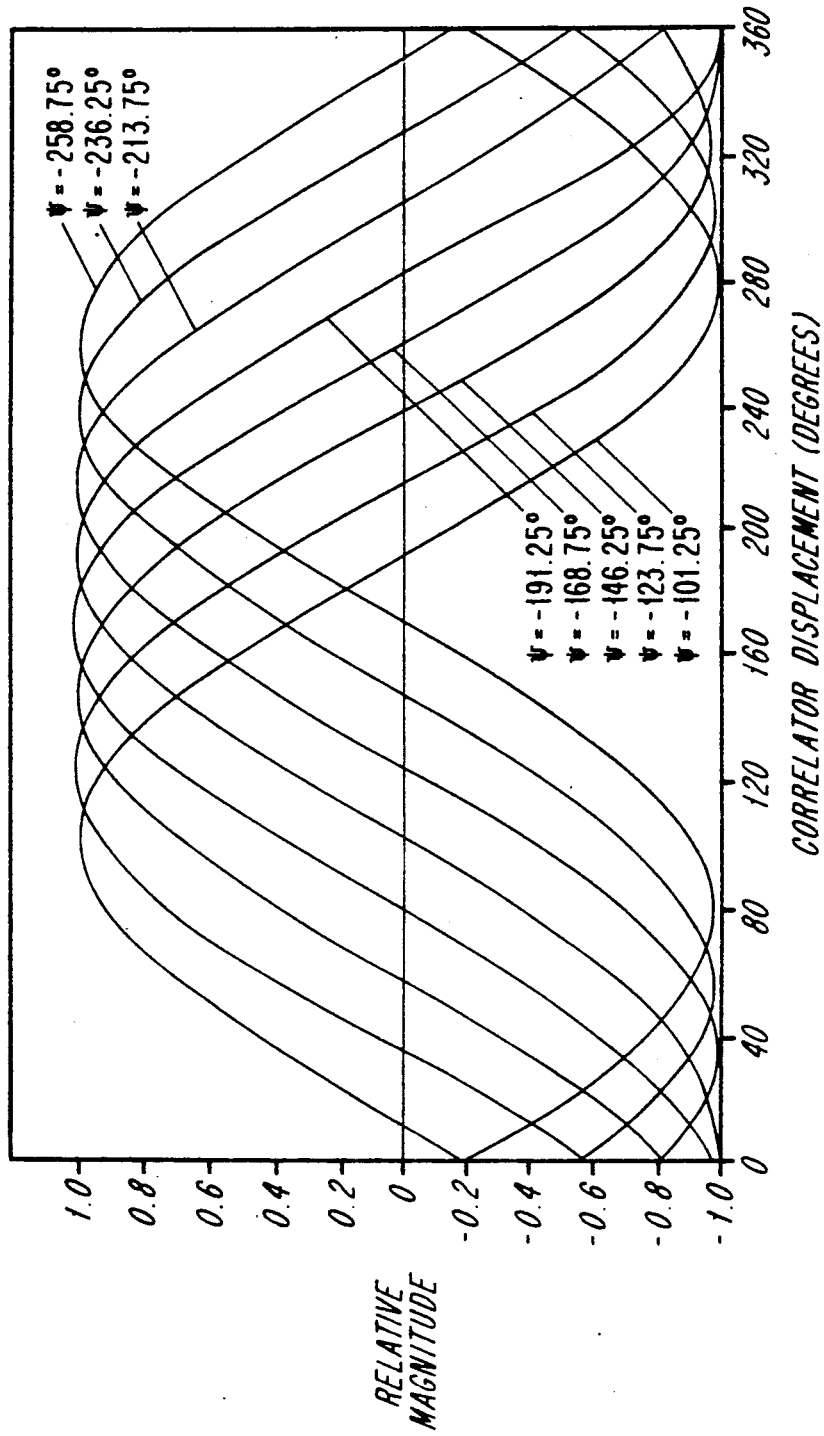

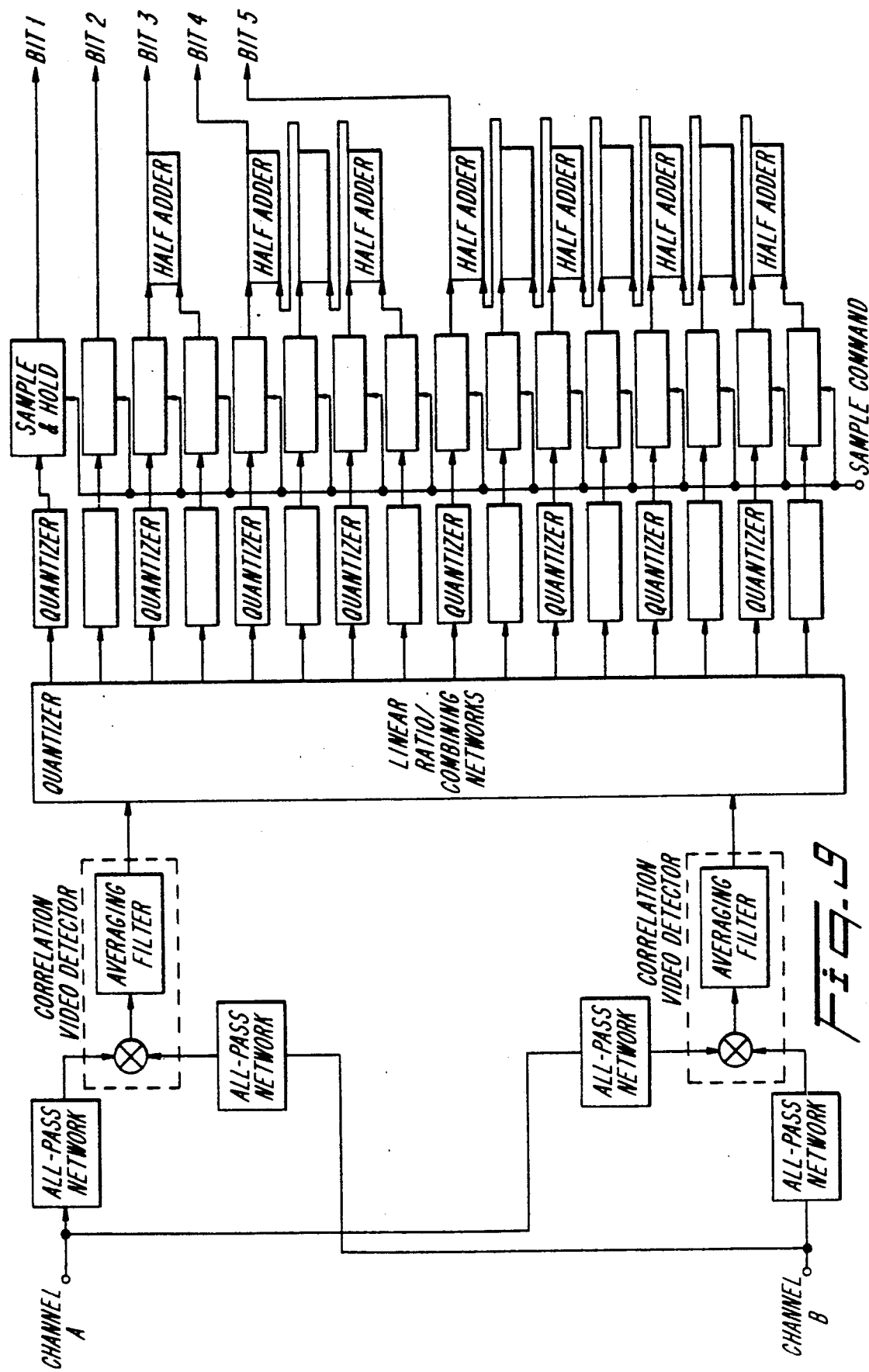

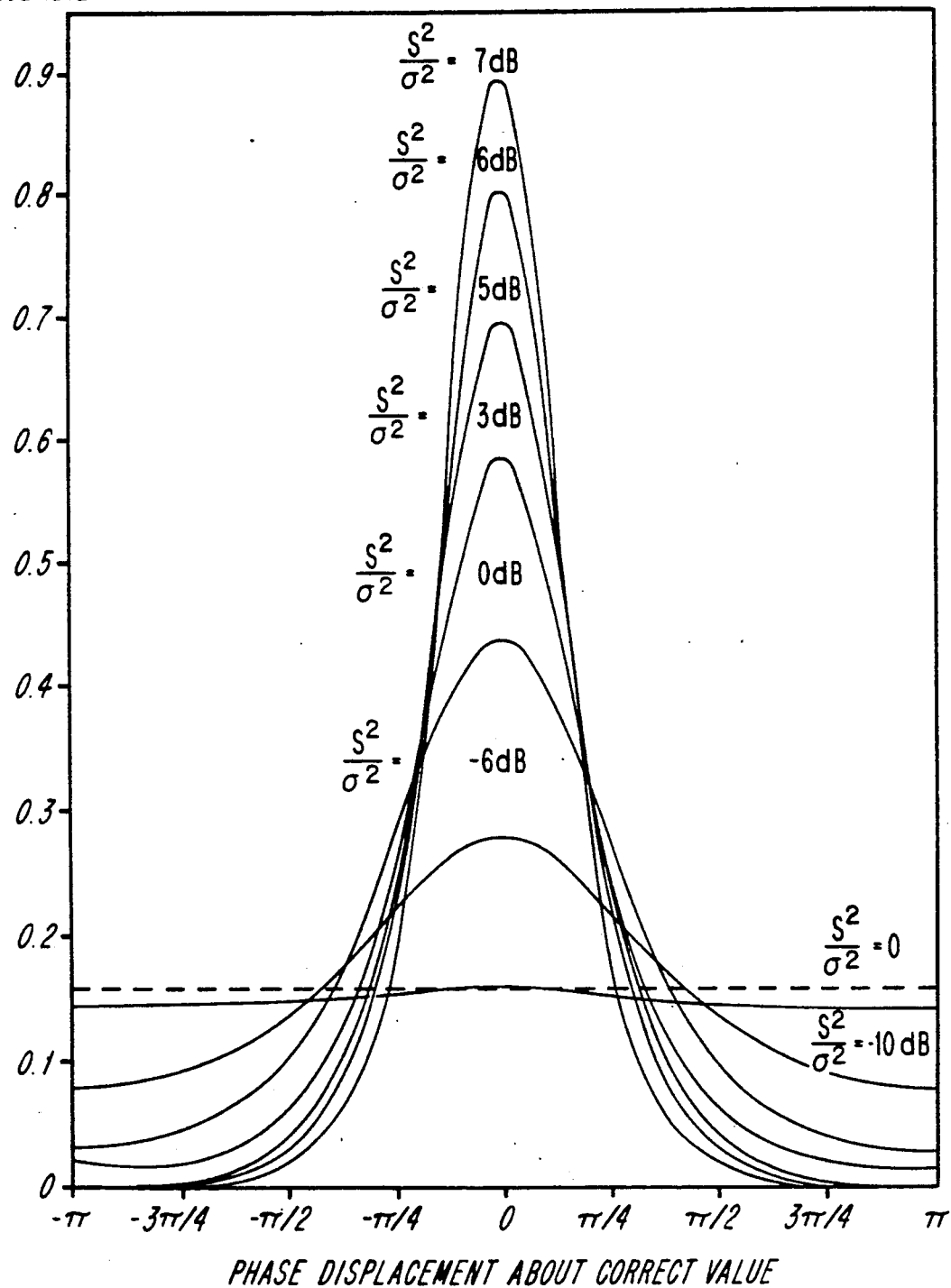

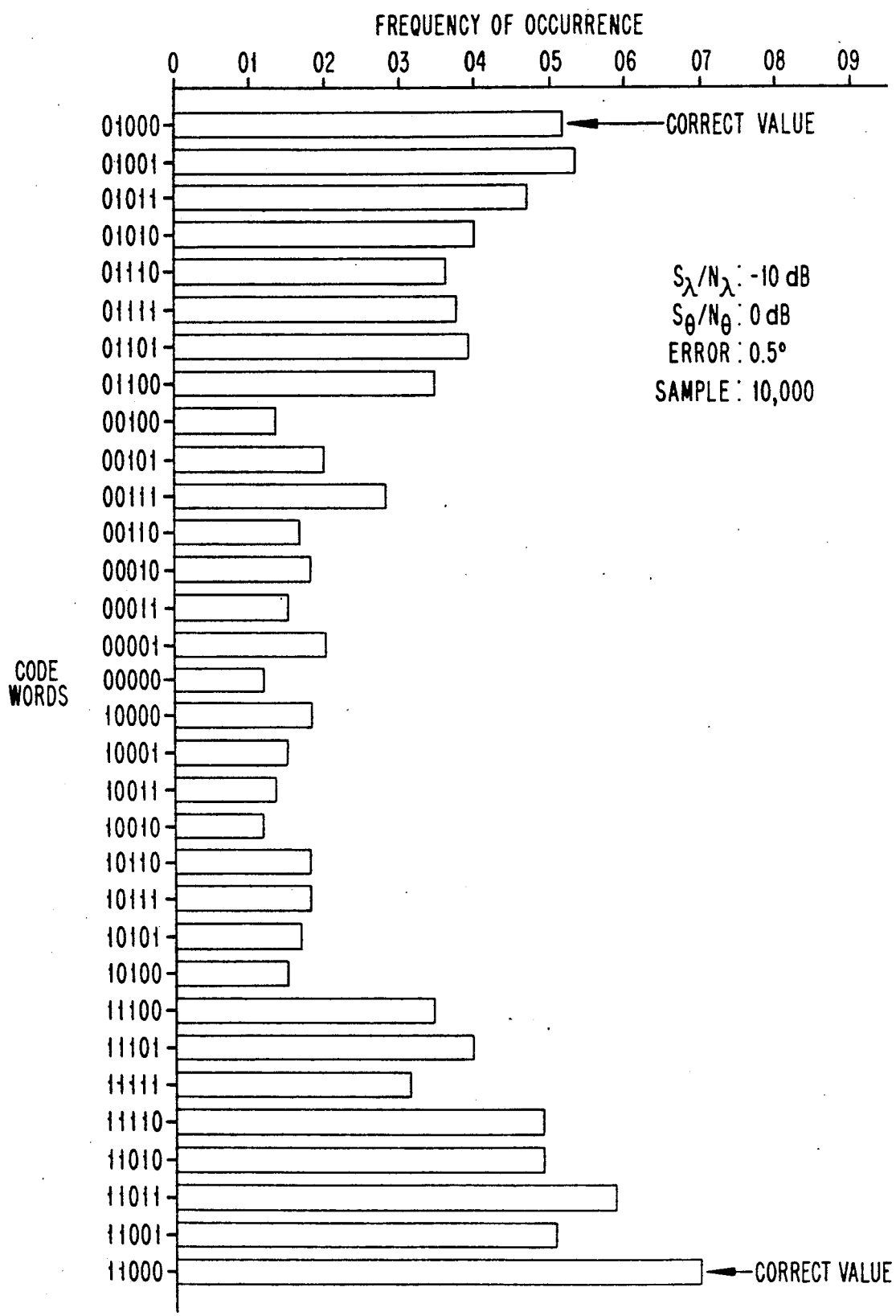

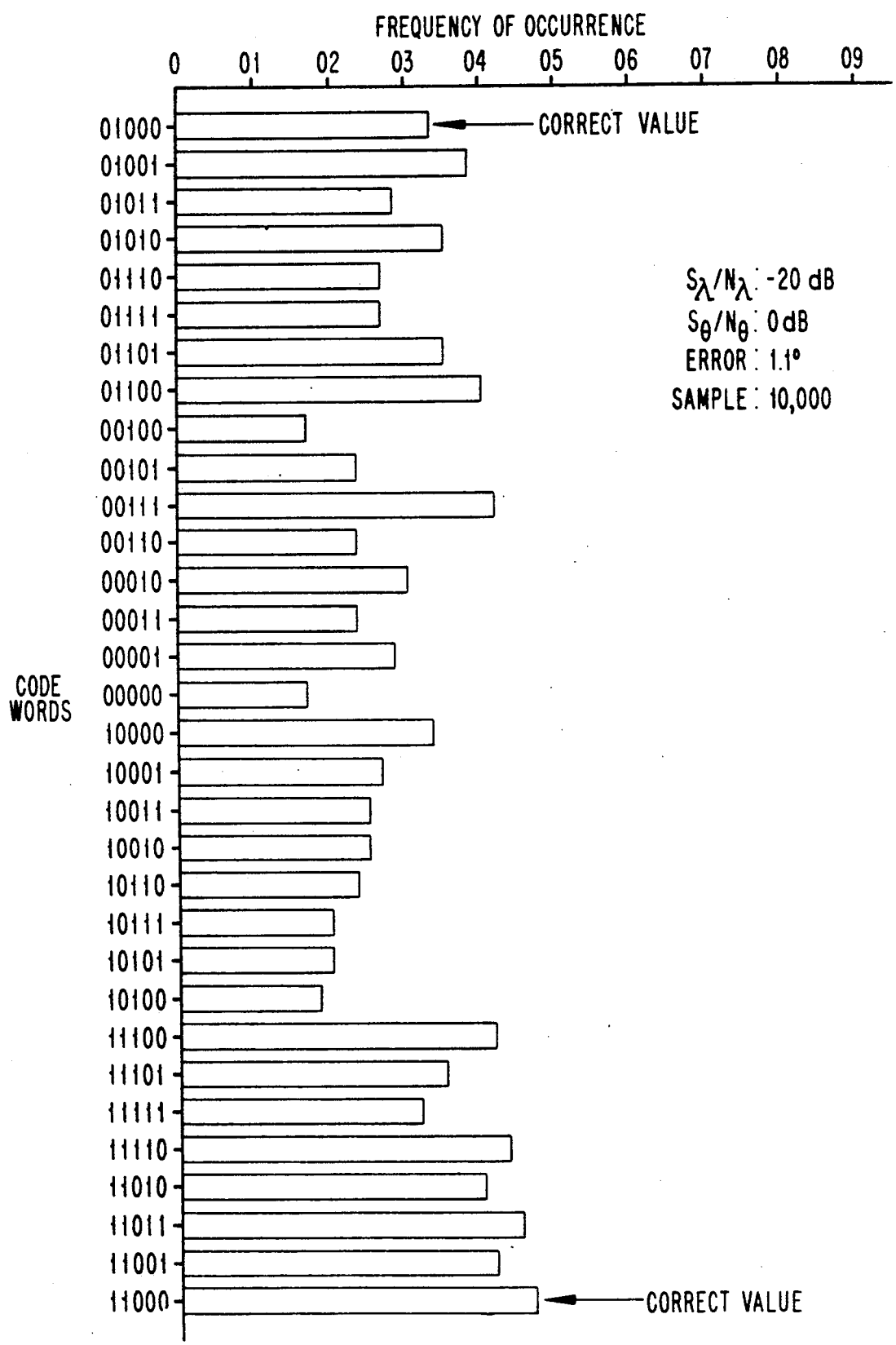

SPREAD SPECTRUM INTERCEPT APPARATUS AND METHOD

This Application is a divisional of application Ser. No. 07/422,838, filed Oct. 17, 1989, now U.S. Pat. No. 5,016,256.

BACKGROUND OF THE INVENTION

This invention relates to a frequency hopping and direct sequence spread spectrum intercept system, and more particularly a system for estimating frequency, angle-of-arrival (phase) and time-of-arrival of frequency hopped and direct sequence spread spectrum signals.

DESCRIPTION OF THE PRIOR ART

Spread spectrum signals have been utilized in the past for secure communications due to the pseudo-random coding employed and the fact that the spread out signals are barely above the noise level. Because of the spread spectrum and the manner in which that signal is generated it is difficult to either detect the presence of the spread spectrum signal or to demodulate the signal without foreknowledge of the particular pseudo-random phase shift code.

One type of spread spectrum signal is called a "direct sequence" spread spectrum signal. This signal is generated by rapidly changing the phase of a narrowband signal from 0° to 180° in a pseudo-randomly known fashion. The effect of pseudo-randomly varying the phase of the signal is to spread out the frequency spectrum of the original signal in a (sin X)/X fashion. The pseudo-random phase changes are coded such that a predetermined series of phase changes are made to occur, with both the sender and the recipient knowing the code. The code might, for instance, involve shifting from a phase of 0° to 180° at a time $T_1$ and then shifting back to 0° phase 1 microsecond later; with a further phase shift to 180° 3 microseconds later, etc.

It will be noted that the spread in frequency of the signal is such that the spread spectrum bandwidth is 2/minimum code length. In the above example, the minimum code length would be 1 microsecond and the signal is therefore spread out to a bandwidth of 2 MHz.

What is accomplished by spreading out the signal in this manner is to make the signal appear just above the noise level. For an individual knowing the exact pseudo-random code, the individual can set his receiver so as to change phase exactly in time with the transmitted signal. Once having done this, the pseudo-random phase changes are cancelled out which results in the signal being brought out of the noise. The recipient can then demodulate the remaining signal, assuming that the modulation rate is much slower than the pseudo-random code rate.

Another type of spread spectrum signal is called "frequency hopped" spread spectrum. This signal is generated by rapidly changing the frequency of a narrowband signal across a wide bandwidth in a pseudo-randomly known fashion. The effect of pseudo-randomly varying the frequency of the signal is to spread out the frequency spectrum of the original signal over the wide bandwidth of the frequency hopping. The pseudo-random frequency changes are coded such that a predetermined series of frequency changes are made to occur, with both the sender and the recipient knowing the code.

U.S. Pat. No. 4,247,939, to Stromswold et al., issued Jan. 27, 1981, which is incorporated herein by reference, describes a spread spectrum detector utilizing compressive receiver techniques and squaring of an incoming signal to detect the presence of a spread spectrum signal and to obtain its center frequency, with the squaring cancelling the pseudo-random code. This patent discloses using a dispersive display line to a narrowband filter set to detect the center frequency.

To date, there has been no particular method or apparatus provided for making an efficient measurement of a frequency hopping spread spectrum signal, and detecting that signal with a low signal-to-noise ratio.

OBJECTS AND SUMMARY OF THE INVENTION

An object of the present invention is to provide a powerful and robust technique for recovering the relative phase between two input signals.

Another object of the present invention is to provide a phase measurement technique which operates at low signal-to-noise ratios.

An additional object of the invention is to provide a phase detector that is insensitive to input waveform type and noise.

A still further object of the invention is to provide a phase detector having a performance which is identical for any type of modulation forms.

Another object of the invention is to perform all signal processing in the phase domain and infer frequency domain and time domain attributes of an intercepted signal from the phase domain.

According to the present invention, as embodied and broadly described herein, an apparatus for detecting an intercept signal having spread spectrum modulation, is provided, comprising a first antenna, a second antenna, first channelizing means, second channelizing means, measuring means, and generating means.

The first antenna outputs a first sample of the intercept signal. The second antenna outputs a second sample of the intercept signal. The first channelizing means channelizes the spectrum of the first sample of the intercept signal from the first antenna into a first plurality of spectrum segments, with each spectrum segment having a corresponding segment signal, respectively. The second channelizing means channelizes the spectrum of the second sample of the intercept signal from the second antenna into a second plurality of spectrum segments having the same center frequencies and bandwidths as the first plurality of spectrum segments. Each spectrum segment of the second plurality of spectrum segments has a corresponding segment signal, respectively. The measuring means measures a corresponding plurality of frequencies and times of arrival of each of the first plurality of segment signals, respectively, and estimates a plurality of segment phase angles between corresponding segment signals having the same center frequency, of the first and second plurality of segment signals from the first channelizing means and the second channelizing means, respectively. The frequency, phase and time generating means generates from the plurality of frequencies, times of arrival and phase angles, a frequency estimate, a time of arrival estimate and a phase estimate of an angle of arrival, respectively, of the intercept signal.

Additional objects and advantages of the invention will be set forth in part in the description which follows, and in part will be obvious from the description, or may be learned upon practice of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 5 is a block diagram of the correlation phase detector according to the present invention;

FIGS. 6A and 6B are a reference and quadrature correlator transfer functions;

FIG. 7 illustrates a displaced correlation functions;

FIG. 9 is a block diagram of the correlation phase detector according to the present invention;

FIG. 10 illustrates the probability density functions for phase displacement around a correct value; and FIG. 11A illustrates a posteriori averaging; and FIG. 11B illustrates a posteriori averaging.

DETAILED DESCRIPTION OF THE PREFERRED EMBODIMENTS

Reference will now be made in detail to the present preferred embodiments of the invention, examples of which are illustrated in the accompanying drawings.

Figure 1:
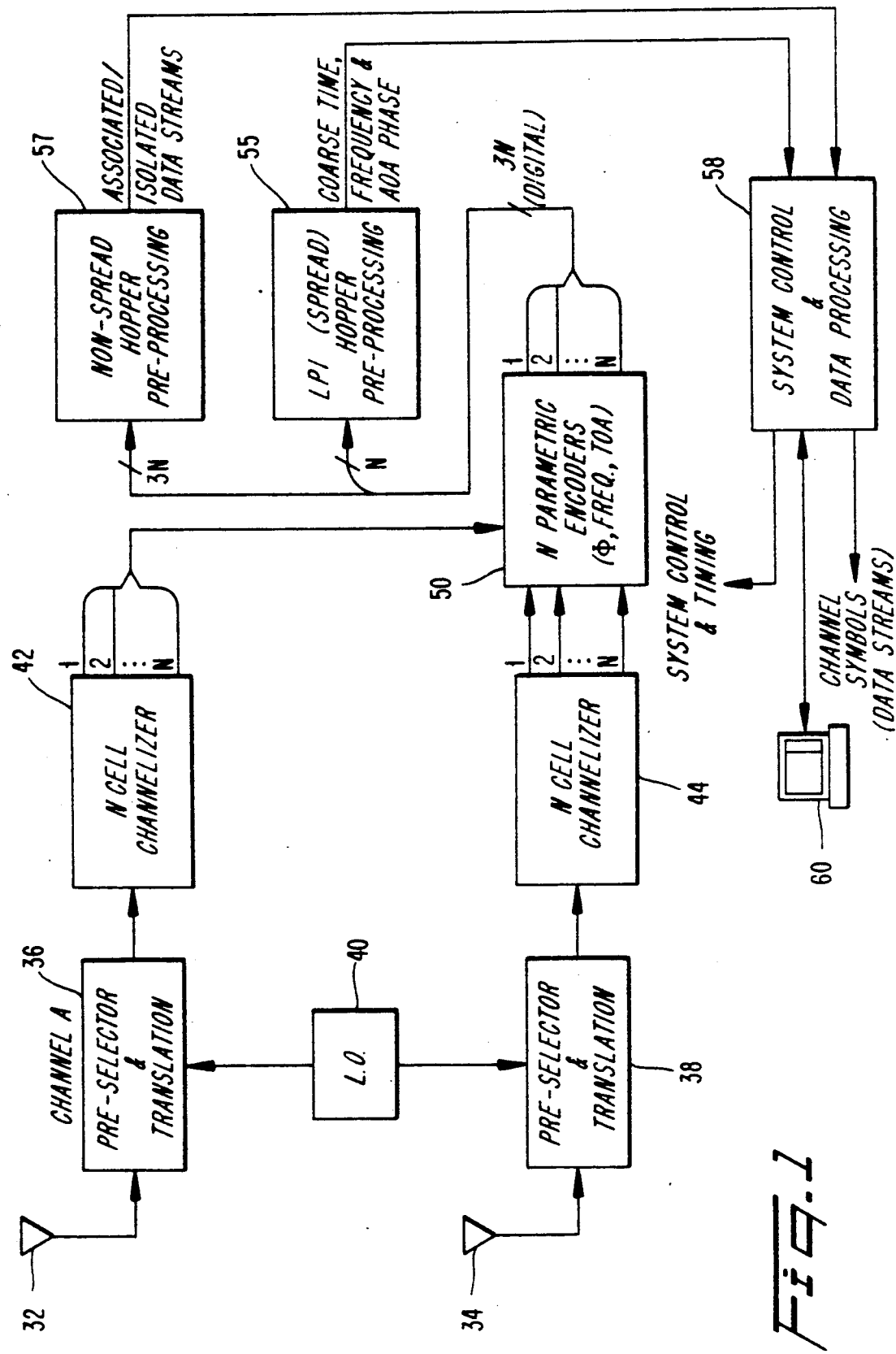
FIG. 1 is a block diagram of a frequency hopping spread spectrum detector.

As illustratively shown in FIG. 1, an apparatus for detecting an intercept signal having spread spectrum modulation is provided, comprising a first antenna 32, a second antenna 34, first channelizing means, second channelizing means, measuring means, and generating means. First channelizing means, second channelizing means, and measuring means may be embodied as first channelizer 42, second channelizer 44, and parametric encoders 50. The generating means may be embodied as LPI hopper preprocessor 55 and/or nonspread hopper preprocessor 57. A particular embodiment of the invention may further include local oscillator 40, first preselector and translator 36, second preselector and translator 38, system control and data processor 58, and output display 60.

In the exemplary arrangement shown, the first antenna 32 is coupled through first preselector and translator 36 to first channelizer 42. The second antenna 34 is coupled through second preselector and translator 38 to second channelizer 44. Frequency translation in first and second preselectors and translators 36, 38 is controlled by local oscillator 40.

The first channelizer 42 and the second channelizer 44 are coupled to parametric encoders 50. The parametric encoders 50 are coupled to non-spread hopper preprocessor 57 and LPI hopper preprocessor 55. The non-spread hopper preprocessor 57 and spread hopper preprocessor 55 are coupled to system control and data processor 58, which is coupled to display 60.

The first antenna 32 outputs a first sample signal of the intercept signal. The second antenna 34 outputs a second sample signal of the intercept signal. The first and second preselectors and translators 36, 38 filter and frequency translate the first and second sample signals of the intercept signal, respectively, to an intermediate or baseband frequency range. The first channelizer 42 channelizes the spectrum of the first sample signal of the intercept signal, which has been filtered and frequency translated by first preselector and translator 36, into a first plurality of spectrum segments. Each of the first plurality of spectrum segments has a corresponding segment signal, respectively. The first channelizer 42 may be embodied as a plurality of bandpass filters which divide the intercept bandwidth into a plurality of channels.

The second channelizer 44 channelizes the spectrum of the second sample signal of the intercept signal, which has been filtered and frequency translated by second preselector and translator 38, into a second plurality of spectrum segments. The second plurality of spectrum segments has the same center frequencies and bandwidths as the corresponding first plurality of spectrum segments. Each spectrum segment of the second plurality of spectrum segments has a corresponding segment signal, respectively. The second channelizer 44 may be embodied as a plurality of bandpass filters which divide the intercept bandwidth into a plurality of channels.

For intercept signals having a large signal to noise ratio, the parametric encoders 50 measure a corresponding plurality of frequencies and times of arrival of each of the first plurality of segment signals, respectively, and estimate a plurality of correlation function phase signals between corresponding segment signals having the same center frequency, of the first and second plurality of segment signals from the first channelizer 42 and the second channelizer 44, respectively. The non-spread hopper preprocessor 57, from the plurality of frequencies, times of arrival and phase angles, generates a frequency estimate, a time of arrival estimate and a phase estimate of an angle of arrival, respectively, of the intercept signal.

For a spread spectrum signal which is received having a low signal to noise ratio, the N parallel parametric encoders 50 generate a correlation function phase signal from which coarse frequency estimates, time of arrival estimates, and phase estimate of an angle of arrival, of the intercept signal are generated by LPI hopper preprocessor 55. System control and data processor 58 control operation of the present invention and process data, and data are displayed on display 60.

Figure 2:
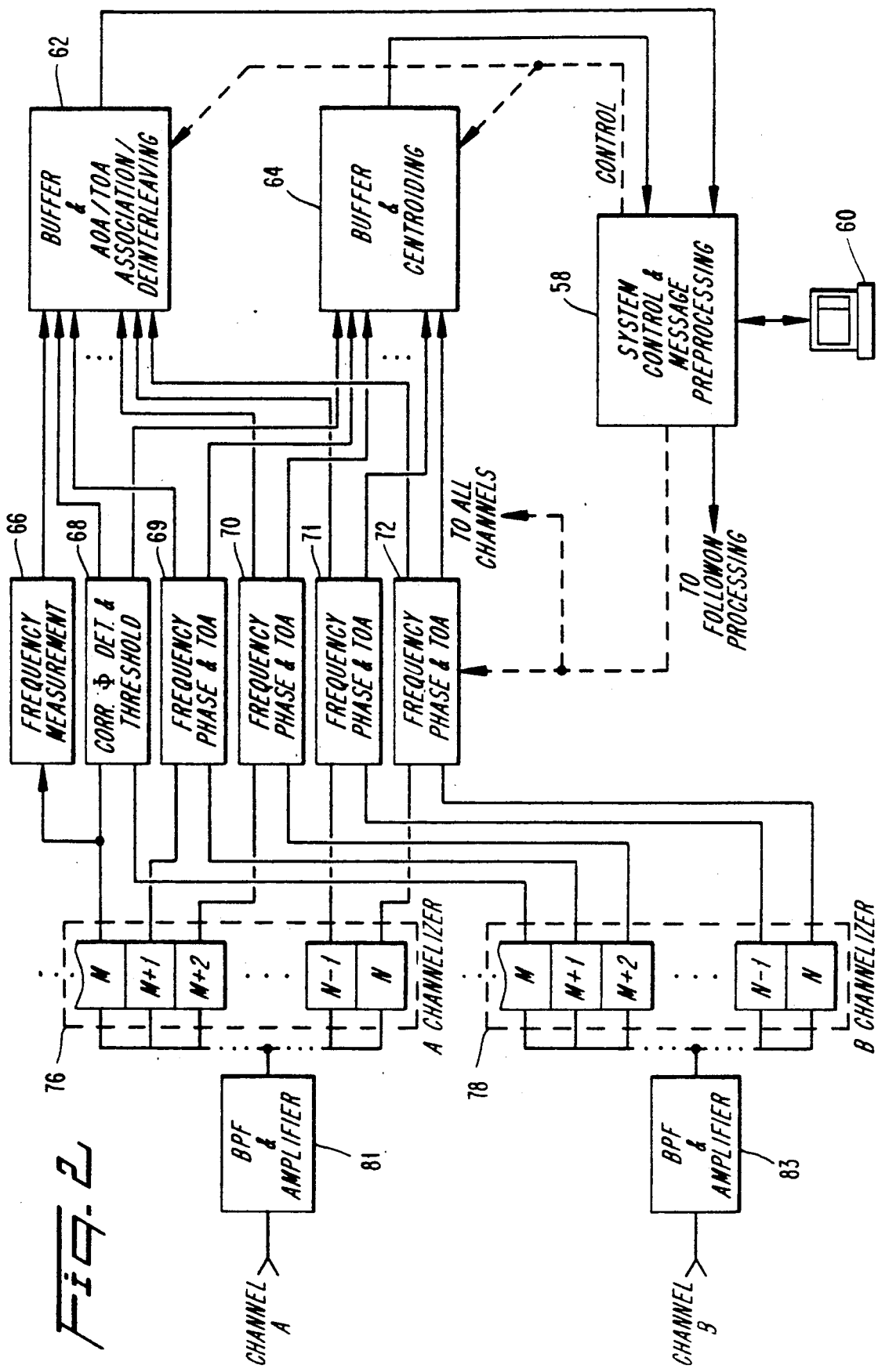
FIG. 2 illustrates a frequency hop direct sequence intercept system.

FIG. 2 illustrates a preferred embodiment of the present invention for a frequency hopped and direct sequence spread spectrum intercept system. Shown in FIG. 2 are first bandpass filter and amplifier 81, second bandpass filter and amplifier 83, first channelizing means, second channelizing means, measuring means and generating means. First channelizing means is embodied as first channelizer 76, second channelizing means is embodied as second channelizer 78, and measuring means is embodied as frequency measurement device 66, correlation phase detector 68, and frequency, phase and time-of-arrival devices 69, 70, 71, 72. The generating means is embodied as buffer and centroiding device 64 and buffer and angle-of-arrival device 62.

As illustrated in FIG. 2, the frequency, phase, and time-of-arrival devices 66, 68, 69, 70, 71, 72 are coupled to corresponding channels having the same center frequency, respectively, of first channelizer 76 and second channelizer 78. The first and second channelizers 76, 78 are coupled to first and second bandpass filters 81, 83, respectively, which are coupled to first and second antennas, respectively.

In operation, the first antenna outputs a first sample signal of the intercept signal. The second antenna outputs a second sample signal of the intercept signal. The first and second bandpass filters 81, 83 filter the first and second sample signals of the intercept signal, respectively. The first channelizer 76 channelizes the spectrum of the first sample signal of the intercept signal, which has been filtered and frequency translated by first bandpass filter 81, into a first plurality of spectrum segments. Each of the first plurality of spectrum segments has a corresponding segment signal, respectively.

The second channelizer 78 channelizes the spectrum of the second sample signal of the intercept signal, which has been filtered and frequency translated by second bandpass filter 83, into a second plurality of spectrum segments. The second plurality of spectrum segments has the same center frequencies and bandwidths as the corresponding first plurality of spectrum segments. Each spectrum segment of the second plurality of spectrum segments has a corresponding segment signal, respectively.

The frequency, phase and time-of-arrival devices 69, 70, 71, 72 measure a corresponding plurality of frequencies and times of arrival of each of the first plurality of segment signals, respectively, and estimate a plurality of correlation function phase signals which represent the phase angles between corresponding segment signals having the same center frequency, of the first and second plurality of segment signals from the first channelizer 76 and the second channelizer 78, respectively. If an intercept signal is received having a large signal to noise ratio, the buffer and angle-of-arrival device 62 generates from the plurality of frequencies, times of arrival and phase angles, a frequency estimate, a time of arrival estimate and a phase estimate of an angle of arrival, respectively, of the intercept signal.

For an intercept signal having a low signal to noise ratio the buffer and centroiding device 64, from the plurality of correlation function phase signals, generate a frequency estimate, a time of arrival estimate and a phase estimate of an angle of arrival, respectively, of the intercept signal. System control and data processor 58 control operation of the present invention and process data, and data are displayed on display 60.

Figure 3:
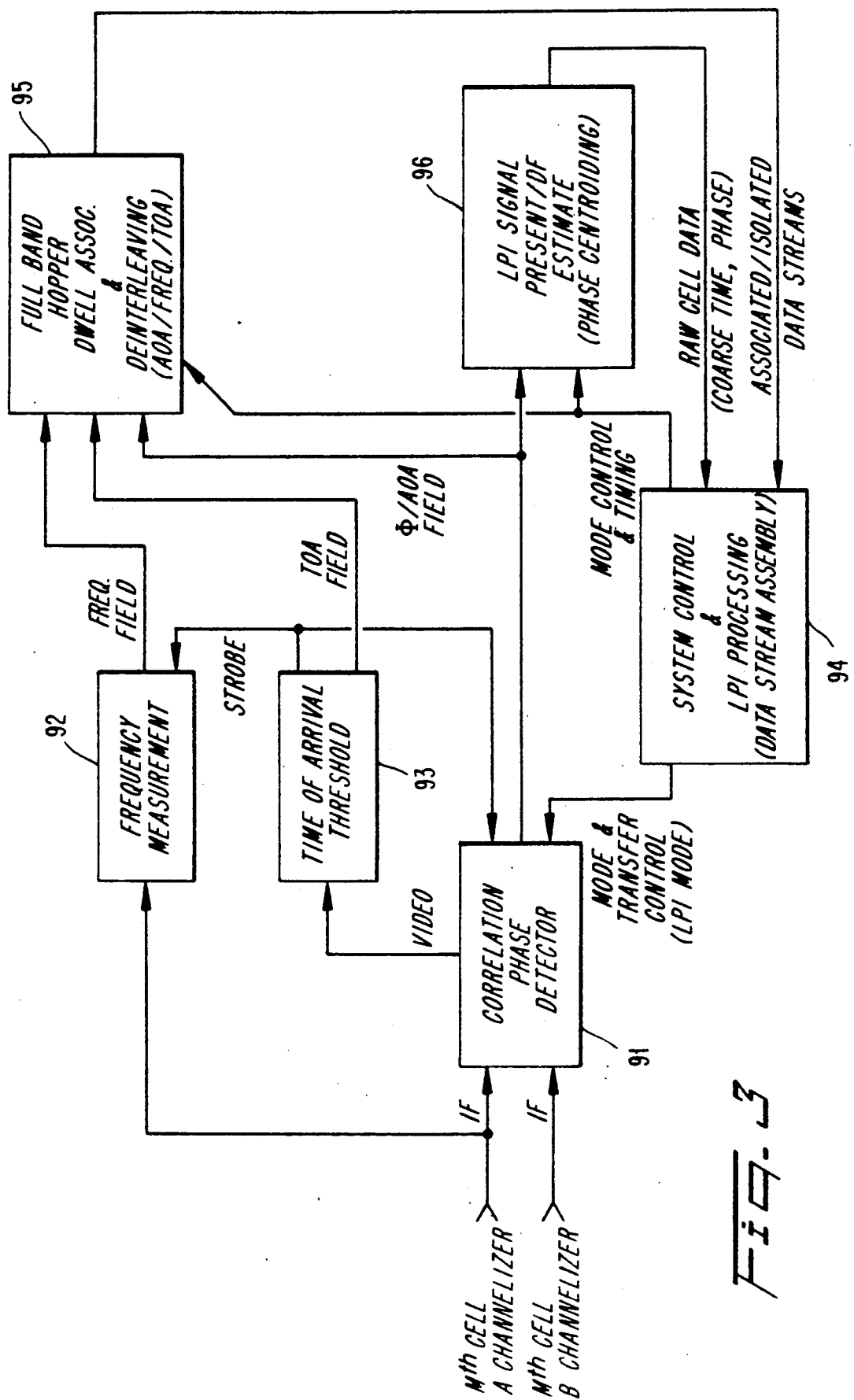
FIG. 3 is a block diagram of a channelizer/processor.

An embodiment of a frequency, phase, and time-of-arrival device is shown in FIG. 3. The device is coupled to the Mth cell of a first channelizer and to the corresponding Mth cell of a second channelizer. A frequency measurement device 92 is coupled to the Mth cell of the first channelizer, and a time-of-arrival threshold device is coupled to the correlation phase detector 91. A full band hopper device 95 is coupled to the frequency measurement device 92, the time-of-arrival device 93, and the correlation phase detector 91. A LPI signal device 96 is coupled to the correlation phase detector 91. A system control and LPI processor 94 is coupled to the correlation phase detector 91, the LPI signal device 96 and the full band hopper device 95. Each cell at the output of the channelizers have the frequency, phase and time of arrival device as shown in FIG. 3.

In operation the frequency measurement device 92 and time-of-arrival device 93 measure frequency and time-of-arrival of intercept signals having large signal to noise ratios, for example, greater than 7 dB. The phase is compared between the segment signal of first sample signal from the Mth cell of the first channelizer and the segment signal of the second sample signal from the Mth cell of the second channelizer. The phase angle is used to determine the angle of arrival of an intercept signal, relative to the first and second antennas.

For intercept signals having a low signal to noise ratio, the correlation phase detector 91 generates a correlation phase function signal and LPI signal device 96 performs phase centroiding from the correlation function phase signals. The LPI signal device 96 can make a good estimate of the intercept signal even at low signal to noise ratios. Assume that each cell has a bandwidth of 1 MHz, and the cells are sampled at the rate of one million samples per second. If there is only uncorrelated noise at the input to a cell, since noise has a zero mean, then the averaged output over N samples generates an output of zero. If an intercept signal is present in a cell, and assuming that the intercept is of a spatially coherent signal, then intercept signal adds coherently, and a 30 dB gain can be achieved in one millisecond. In one millisecond there are 1000 samples, and coherent addition of 1000 samples can generates a 30 dB gain for a 1 millisecond time dwell per sample. For an intercepted spatially coherent signal having a $-10$ dB signal to noise ratio this 1 millisecond time dwell, which can average 1000 samples of correlation function phase signals, improves signal to noise ratio (SNR) by 30 dB, which yields a 20 dB SNR phase estimate. Thus one can have a high confidence that a signal is present in a particular cell based on the phase estimate from that cell.

Assuming that there are N cells, if $N-1$ cells have noise and the $N^{th}$ cell has an intercept signal, then the samples of the phase estimate will yield the presence of the intercept signal in the $N^{th}$ cell as measured by the phase centroid, and generate an estimate of frequency from the cell from which the estimate was made, and/or a time of arrival.

In summary, from the output of the channelizers, one has a reasonable estimate of frequency based on which cell develops a phase centroid. This holds for intercept signals having a low signal to noise ratio, since the estimate is derived from averaging the output of the phase detector.

Figure 4:
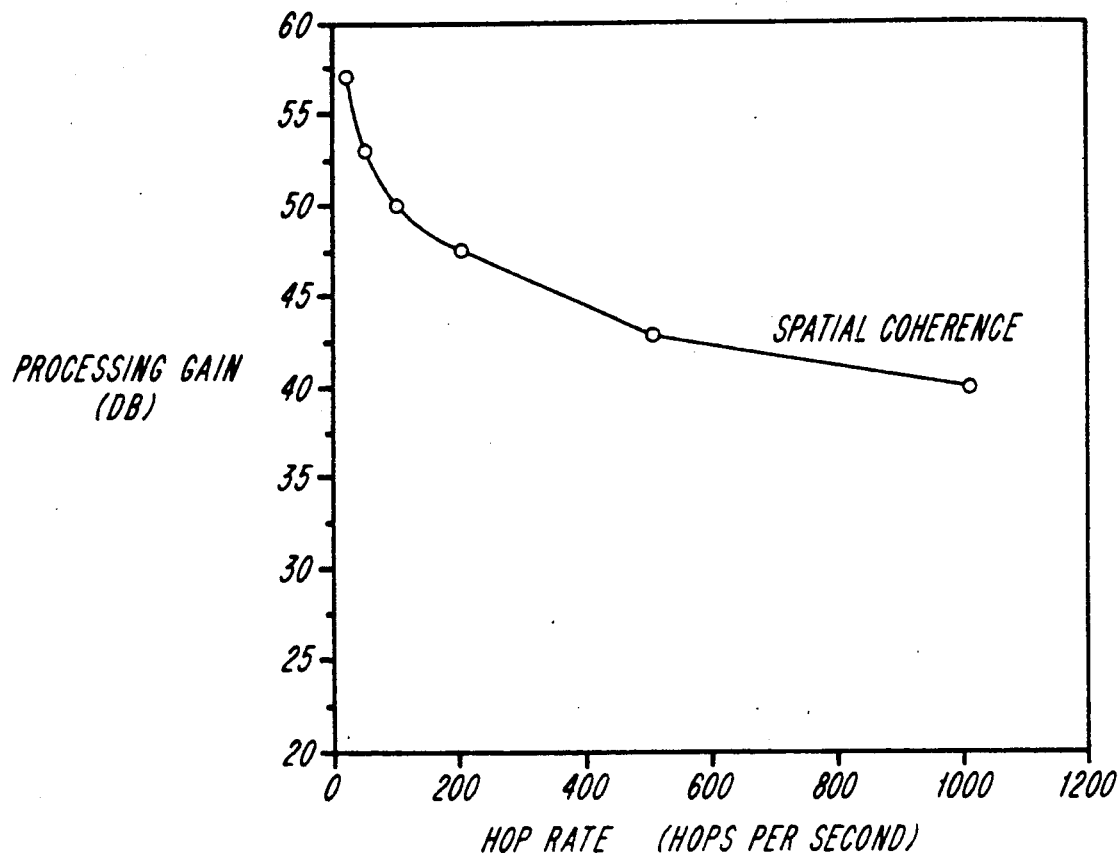
FIG. 4 illustrates the effect of hop rate on the processing game.

FIG. 4 illustrates the processing gain in dB versus hop rate of a frequency hopped spread spectrum signal.

FIG. 5 shows a phase detector of the present invention. A first signal is multiplied by first and second product device 112, 114. A second signal is multiplied by the first signal by second product device 114. The second signal is phase shifted 90° by phase shifter 116, and then multiplied by the first signal by first product device 112. The outputs of the first and second product devices 112, 114 are filtered by first and second low pass filters 118, 120, respectively. A correlation function phase shifter 122 generates a correlation function phase signal from the outputs of the first and second low pass filters 118, 120. By not using any limiting device the estimates based on the correlation function phase signal are independent of signal to noise level. The correlation function phase signal is the relative phase between the first and second signals.

The phase detector has application to low signal-to-noise (SNR) measurement capability. The phase detector of FIG. 5 is an approach to phase measurement for an intercept signal having a SNR less than 0 dB. All other conventional phase detection techniques hard-limit the input to mitigate amplitude variations with the undesirable consequence of the hard limiting, that the transfer function completely degenerates at equal signal and noise powers so that recovery of phase estimate for low SNR signals is impractical. Additionally, since the basic mechanism is a cross-correlation between the two input channels, performance of the phase detector of FIG. 5 is completely insensitive to the input waveform: amplitude modulation, phase modulation, frequency modulation, or a random Gaussian process. Performance is identical for any of the known forms of modulation. Consequently, the phase detector of FIG. 5 provides a very powerful and robust technique for recovery of the relative phase between two input channels.

The phase detector can be applied to a delay line type of discriminator, wherein the delay element is equal to or larger than the reciprocal of the bandwidth prior to the discriminator. The application of this correlation phase detector to a delay line discriminators can be used with intercept signals having low SNR.

Figure 8:
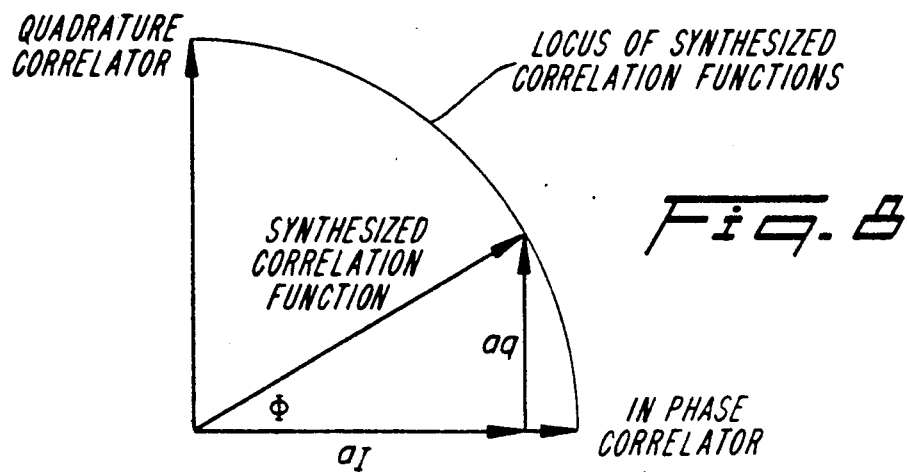
FIG. 8 illustrates the desired phase measurement and granularity produced by linear combinations of in-phase and quadrature correlators.

FIGS. 6A and 6B depict the reference and quadrature correlator transfer functions as the relative magnitude of the output of the correlation function phase shifter, versus input phase in degrees. FIG. 7 shows displaced correlation functions as the relative magnitude of the output of the correlation function phase shifter, versus correlator displacement in degrees. For five bit quantization, there are zero crossings every 11.25°. FIG. 8 illustrates the desired phase measurement granularity produced by linear combinations of in-phase and quadrature correlators shown as the locus of synthesized correlation functions for the phase correlator. The phase granularity is based on the number of bits, and for example, with 5 bits quantization, the phase granularity is 11.25°. FIG. 7 illustrates 8 of 14 displaced phases.

FIG. 9 illustrates the output quantization of the correlation phase detector. The output of each low pass filter is coupled to a linear ratio combination network, from which are coupled quantizers, sampled and hold circuitry, and threshold devices. In the particular embodiment shown, there is circuitry for quantization of phase for 5 bits. FIG. 10 is a probability density function for phase displacement about the correct value. FIG. 11A and 11B are histograms of a posteriori averaging of frequency of occurrence of the phase correlator of the present invention.

The general application attributes of the frequency hopping detector are threefold:

(1) product a means for detection, localization (when used on a mobile platform capable of producing a baseline or two or more simultaneous locations) of hybrid (DS/FH or LFM/FH) and compound (DS/FH/TH and LFM/FH/TH) frequency hopping signals. Under matched bandwidth conditions, the detection is accomplished with three dB more processing gain than that embodied by the source waveform. By matched bandwidth conditions is meant, that the channelizer individual cell bandwidth is equal to the principal lobe of the source spectrum.

(2) Direct demodulation of the channel symbols of simplistic frequency hopping or hybrid and compound frequency hopping signals when the source employs M-ARY channel encoding.

(3) The technique is also applicable to the receiving terminal of cooperative communication circuits without requiring synchronization to the transmitted signal. This type of application has significant potential benefits when the received signal is subject to unintentional interference or intentional jamming inasmuch, as the SNR (or S/J) performance during the synchronization period is generally significantly lower than after synchronization has been achieved.

The operational device depends uniquely, i.e., only, upon the spatial coherence of the source and independent of specifics of the intercept signal. The control logic provides for adoption of the sample period to accommodate to the specific hop rate employed by the source and provides a means for discriminating between simple unhopped signals and the frequency hopped signals of interest by a simple comparison of multiple sampling periods to determining which received signals continue to operate at the same frequency and line-of-bearing (LOB) and which signals produce separate frequency dwells at a common LOB. The basic associative parameter is the LOB produced by the source. This same parameter is also effectively employed to separate multiple coexistent signals within the common frequency-spatial field-of-view.

The present invention essentially is a mechanization of a parallel hypothesis testing for the existence of a stable, coherent phase centroid in each of the cells of the channelizer. Note that the embodiments as illustrated in the figures simultaneously search for simple fast frequency hopping signals and LPI hybrid and/or compound frequency hopping signals. During each sample collection period, as controlled by the system control processor, if the amplitude threshold is not raised, samples of the phase detector output (digital words) are collected at the maximum rate which will ensure that the system noise is uncorrelated sample-to-sample. At the end of each data collection period, the samples are simply averaged to produce an estimate of the phase centroid extant during the sampling period and the frequency/AOA data are placed in a holding buffer. The AOA (phase value) related data field is used as the associative factor to aggregate frequency fields associated with a common source. Since the basic data words contain the time of the start of each sample, AOA (phase estimate) and frequency cell, everything needed to recover the basic channel encoding is present when the succession of data words are assembled as time ordered outputs corresponding to each of the active frequency hopping emitters.

If, on the other hand, the amplitude threshold is raised during a given sample period (nominal 11 to 13 dB SNR), the presumption is that the source is a simple non-hybrid frequency hopping signal and the data words placed in the holding buffer. Each data word contains time-of-threshold crossing, fine frequency (interior to each of the channelizer individual cells) and angle-of-arrival (phase measurement). These above threshold associated data words are placed in a separate area of the holding buffer reserved for simple non-hybrid frequency hopping signals. Again, all data required for recovery of the channel data are present, i.e., time and frequency of hop. Note that this parallel mode of operation is essentially independent of the input signal characteristics since even a poorly executed amplitude threshold will respond in a few nanoseconds. Thus, the individual device limit on hop rate is defined uniquely by the individual channelizer cell bandwidths.

The basic associative parameter, the angle-of-arrival, and the sample time or time to threshold crossings, in the case of simple non-hybrid frequency hopping signals, is included in each data word. Recovery of all types of frequency hop types of signals (simple, compound, or hybrid FH/TH) is easily effected.

One of the unique features of the correlation phase detector is an unambiguous encoding over the full interval (0, 360°) which produces a 2:1 increase in AOA measurement accuracy as compared with a conventional phase detector (since a one-wavelength interferometer baseline can be used). The normal, conventional phase detector is transcendental over the interval (0, 180°). Consequently, the expectation of robust association (and separation) of signals is considerably higher than with any other technique.

It will be apparent to those skilled in the art that various modifications may be made to the spread spectrum detector of the instant invention without departing from the scope or spirit of the invention, and it is intended that the present invention cover modifications and variations of the spread spectrum detector provided they come within the scope of the appended claims and their equivalents.

I claim:

1. An apparatus for detecting an intercepted signal having spread spectrum modulation, comprising:
    a first antenna for receiving a first sample signal of the intercepted signal;
    a second antenna for receiving a second sample signal of the intercepted signal;
    first means coupled to said first antenna for channelizing the spectrum of the first sample signal of the intercepted signal into a first plurality of spectrum segments, with each spectrum segment having a corresponding segment signal, respectively;
    second means coupled to said second antenna for channelizing the spectrum of the second sample signal of the intercepted signal into a second plurality of spectrum segments having the same center frequencies and bandwidths as the first plurality of spectrum segments, with each spectrum segment of the second plurality of spectrum segments having a corresponding segment signal, respectively;
    means coupled to said first channelizing means and said second channelizing means for measuring a corresponding plurality of frequencies and times of arrival of each of the first plurality of segment signals, respectively, and for generating a plurality of correlation function phase signals which represent the phase angles between corresponding segment signals having the same center frequency, of the first and second plurality of segment signals from said first channelizing means and said second channelizing means, respectively; and
    means coupled to said measuring and estimating means for generating from the plurality of frequencies, times of arrival and phase angles, a frequency estimate, a time of arrival estimate and a phase estimate of an angle of arrival, respectively, of the intercepted signal.

2. An apparatus for detecting an intercepted signal having spread spectrum modulation, comprising:
    a first antenna for receiving the intercepted signal;
    a second antenna for receiving the intercepted signal;
    first means coupled to said first antenna for channelizing the spectrum of the intercepted signal into a first plurality of spectrum segments, with each spectrum segment having a corresponding segment signal, respectively;
    second means coupled to said second antenna for channelizing the spectrum of the intercept signal into a second plurality of spectrum segments having the same center frequencies and bandwidths as the first plurality of spectrum segments, with each spectrum segment of the second plurality of spectrum segments having a corresponding segment signal, respectively;
    a correlation function phase detector coupled to said first and second channelizing means and responsive to segments signals from corresponding cells of the first and second plurality of spectrum segments, for generation a correlation function phase signal.

3. The apparatus for detecting an intercepted signal having spread spectrum modulation as set forth in claim 2 further comprising:
    means for measuring a corresponding plurality of frequencies of each of the first plurality of segment signals; and
    means coupled to said measuring means for generating from the plurality of frequencies a frequency estimate of the intercepted signal.

4. The apparatus for detecting an intercepted signal having spread spectrum modulation as set forth in claim 2 further comprising:
    means for measuring a corresponding plurality of times of arrival of each of the first plurality of segment signals; and
    means coupled to said measuring means for generating from the plurality of times of arrival, a time of arrival estimate of the intercepted signal.

5. An apparatus for detecting an intercepted signal having spread spectrum modulation, comprising:
    a first antenna for receiving a first sample signal of the intercepted signal;
    a second antenna for receiving a second sample signal of the intercepted signal;
    a first channelizer for channelizing the spectrum of the first sample signal of the intercepted signal into a first plurality of spectrum segments, with each spectrum segment having a corresponding segment signal, respectively;
    a second channelizer for channelizing the spectrum of the second sample signal of the intercepted signal into a second plurality of spectrum segments having the same center frequencies and bandwidths as the first plurality of spectrum segments, with each spectrum segment of the second plurality of spectrum segments having a corresponding segment signal, respectively;
    a parametric encoder for measuring a corresponding plurality of frequencies and times of arrival of each of the first plurality of segment signals, respectively, and for generating a plurality of correlation function phase signals which represent the phase angles between corresponding segment signals having the same center frequency, of the first and second plurality of segment signals from said first channelizing means and said second channelizing means, respectively; and
    means coupled to said measuring and estimating means for generating from the plurality of frequencies, times of arrival and phase angles, a frequency estimate, a time of arrival estimate and a phase estimate of an angle of arrival, respectively, of the intercepted signal.

6. An apparatus for detecting an intercepted signal having spread spectrum modulation, comprising:
    a first antenna for receiving the intercepted signal;
    a second antenna for receiving the intercepted signal;
    a first channelizer for channelizing the spectrum of the intercepted signal into a first plurality of spectrum segments, with each spectrum segment having a corresponding segment signal, respectively;

a second channelizer for channelizing the spectrum of the intercepted signal into a second plurality of spectrum segments having the same center frequencies and bandwidths as the first plurality of spectrum segments, with each spectrum segment of the second plurality of spectrum segments having a corresponding segment signal, respectively;

a correlation function phase detector for generating a correlation function phase signal from the first plurality of spectrum segments and the second plurality of spectrum segments.

7. The apparatus for detecting an intercepted signal having spread spectrum modulation as set forth in claim 6 further comprising:

means for measuring a corresponding plurality of frequencies of each of the first plurality of segment signals; and means coupled to said measuring means for generating from the plurality of frequencies a frequency estimate of the intercepted signal.

8. The apparatus for detecting an intercepted signal having spread spectrum modulation as set forth in claim 6 further comprising:

means for measuring a corresponding plurality of times of arrival of each of the first plurality of segment signals; and means coupled to said measuring means for generating from the plurality of times of arrival, a time of arrival estimate of the intercepted signal.

9. A method for detecting an intercepted signal having spread spectrum modulation, comprising the steps of:

receiving at a first antenna a first sample signal of the intercepted signal;

receiving at a second antenna a second sample signal of the intercepted signal;

channelizing the spectrum of the first sample signal of the intercepted signal into a first plurality of spectrum segments, with each spectrum segment having a corresponding segment signal, respectively;

channelizing the spectrum of the second sample signal of the intercepted signal into a second plurality of spectrum segments having the same center frequencies and bandwidths as the first plurality of spectrum segments, with each spectrum segment of the second plurality of spectrum segments having a corresponding segment signal, respectively;

measuring a corresponding plurality of frequencies and times of arrival of each of the first plurality of segment signals, respectively;

generating a plurality of correlation function phase signals which represent the phase angles between corresponding segment signals having the same center frequency, of the first and second plurality of segment signals from said first channelizing means and said second channelizing means, respectively; and generating from the plurality of frequencies, times of arrival and phase angles, a frequency estimate, a time of arrival estimate and a phase estimate of an angle of arrival, respectively, of the intercepted signal.

10. A method detecting an intercepted signal having spread spectrum modulation comprising the steps of:

receiving at a first antenna the intercepted signal;

receiving at a second antenna the intercepted signal;

channelizing the spectrum of the intercepted signal into a first plurality of spectrum segments, with each spectrum segment having a corresponding segment signal, respectively;

channelizing the spectrum of the intercepted signal into a second plurality of spectrum segments having the same center frequencies and bandwidths as the first plurality of spectrum segments, with each spectrum segment of the second plurality of spectrum segments having a corresponding segment signal, respectively;

generating a correlation function phase signal from the first plurality of spectrum segments and the second plurality of spectrum segments.

11. The method for detecting an intercepted signal having spread spectrum modulation as set forth in claim 10 further comprising the steps of:

measuring a corresponding plurality of frequencies of each of the first plurality of segment signals; and generating from the plurality of frequencies a frequency estimate of the intercepted signal.

12. The method for detecting an intercepted signal having spread spectrum modulation as set forth in claim 10, further comprising the steps of:

measuring a corresponding plurality of times of arrival of each of the first plurality of segment signals; and generating from the plurality of times of arrival, a time of arrival estimate of the intercepted signal.

* * * * *